350-96.23 SR
6/23/81 XR 4,275,294

United States Patent [19] [11] 4,275,294
Davidson [45] Jun. 23, 1981

[54] SECURITY SYSTEM AND STRIP OR STRAND INCORPORATING FIBRE-OPTIC WAVE-GUIDE MEANS THEREFOR

[75] Inventor: Roderick I. Davidson, Farnham, England

[73] Assignee: Fibun B.V., Netherlands

[21] Appl. No.: 943,693

[22] Filed: Sep. 19, 1978

[30] Foreign Application Priority Data

Sep. 28, 1977 [GB] United Kingdom ............... 40412/77

[51] Int. Cl.[3] ............................................... G02B 5/14
[52] U.S. Cl. ................................ 250/227; 350/96.23; 340/531; 340/555
[58] Field of Search ..................... 350/96.23; 340/555, 340/556, 557, 531, 600, 380; 250/227

[56] References Cited

U.S. PATENT DOCUMENTS

| | | | |
|---|---|---|---|
| 3,887,265 | 6/1975 | Margolis et al. | 350/96.23 |
| 3,938,124 | 2/1976 | Way et al. | 340/531 |
| 4,076,382 | 2/1978 | Oestreich | 350/96.23 |
| 4,089,585 | 5/1978 | Slaughter et al. | 350/96.23 |
| 4,144,530 | 3/1979 | Redfern | 350/96.23 X |
| 4,156,104 | 5/1979 | Mondello | 350/96.23 X |

*Primary Examiner*—David C. Nelms
*Assistant Examiner*—Darwin R. Hostetter
*Attorney, Agent, or Firm*—Larson, Taylor and Hinds

[57] ABSTRACT

To provide security against unauthorised crossing of a boundary, at least one fibre-optic wave-guide extends along the boundary. Light is directed into one end of the guide and the light leaving the guide is detected by an optical detector. An indication is given when the optical intensity of the detected light falls below a predetermined threshold, so as to warn when the wave-guide is disturbed significantly or cut through.

The manufacture of a strip or strand incorporating a fibre-optic wave guide and for use in a security system is also disclosed.

13 Claims, 5 Drawing Figures

SECURITY SYSTEM AND STRIP OR STRAND INCORPORATING FIBRE-OPTIC WAVE-GUIDE MEANS THEREFOR

This invention is concerned with security systems.

It is commonly known to construct boundary fences using cables or wires running between adjacent posts. Such fences can, for example, be used to contain animals within a field or prevent unauthorised entry into an area delimited by the fence. However, there are many such cases where it would be extremely desirable or even essential to be provided with some means of warning when any attempt, even unsuccessful, has been made to cross the boundary.

In this specification, the terms "strip" and "strand" will be used. In the present context, "strip" means a long narrow band of small thickness. "Strand" on the other hand has a broader meaning so as to include also other cross-sectional shapes. According to the invention from a first aspect, there is provided a security system in which a fence wall, or the like, disposed to extend along a given boundary, includes fibre-optic wave guide means running along the boundary, there being an energy source positioned to direct optical radiation along said guide means from one end, and a detector positioned to detect radiation leaving said guide means from the other end and arranged to change its state in response to a change in detected radiation outside a predetermined range.

Herein, the term "optical radiation" includes infra-red and ultra-violet radiation as well as visible radiation.

With the fibre-optic wave guide means mounted to extend between posts positioned along the boundary, then except for negligible disturbances such as produced by wind, any disturbances, for example as might be caused by an animal pressing up against the fibre-optic wave guide means or an unauthorised person endeavouring to cut through the wave guide means, will cause the detector to produce the required change in its aforementioned state and this can be used to operate a warning device such as an alarm.

For protection, the fibre-optic wave guide means may be enclosed in sheathing. Conveniently, the fibre-optic wave guide means comprises merely a single fibre-optic filament or a fibre-optic bundle. As a deterrent against interfering with the security system, the wave guide means in an especially advantageous arrangement is included in a strand which is formed with barbs or serrations along its edes. In a further development, a further strand, comprising fibre-optic wave guide means, is buried beneath the fence, wall or the like, there being a further energy source positioned to direct optical radiation along the guide means from one end, and a further detector positioned to detect radiation leaving these guide means from the other end and arranged to change its state in response to a change in detected radiation outside a predetermined range.

In order that the system can be used for boundaries occupying long distances, the energy source or at least one of the two energy sources (as the case may be) is preferably a laser generator. For added security, the or each generator is set for pulsed operation in accordance with a predetermined code and the associated detector is set to change its state in the absence, in use, of detecting that code.

According to the invention from a second aspect, there is provided a composite strip incorporating fibre-optic wave guide means extending longitudinally of the strip.

Generally, the strip will be bendable, so that it will be suitable for winding onto a drum for storage purposes until it is required to be installed at the boundary concerned.

In one construction, the strip comprises an elongate carrier coated with corrosion resistant material which covers the wave guide means.

Especially advantageously, barbs or serrations are formed at intervals along each longitudinal edge of the strip.

According to the invention from a third aspect, there is provided a fibre-optic filament coated with plastics material, the external diameter of the coating being at least 0.1 inch.

According to a fourth aspect of the invention, there is provided a method of making composite strand incorporating fibre-optic wave guide means extending longitudinally of the strand, in which method the wave guide means is positioned against an elongate carrier, and then the core and the introduced wave guide means are coated with material.

Conveniently, the carrier is formed with longitudinally extending groove means into which the wave guide means is introduced for positioning against the carrier.

Barbs or serrations can be formed at intervals along longitudinal edges of the strand by a stamping process.

For a better undetstanding of the invention and to show how the same may be carried into effect, reference will now be made, by way of example, to the accompanying drawings in which.

Figure 1:
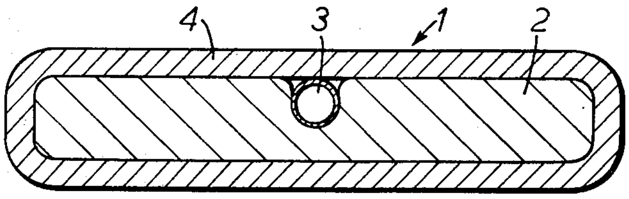
FIG. 1 is a cross-sectional view through a composite elongate strip incorporating a single fibre-optic filament.

Referring to FIG. 1, a composite strip 1 of bendable material comprises a carrier strip 2 which can be made of steel and is preferably formed along one of its two principal faces with a longitudinal groove running along the centre of the face. Inserted in this groove is a single fibre-optic filament 3 and then the carrier strip is coated with a suitable corrosion-resistant material, e.g. zinc, for example by immersion in a molten zinc bath, to form sheathing 4 around the carrier strip. The longitudinal groove is not essential, it being possible merely to position the filament 3 against the carrier strip 2 and then coat the strip 2 and filament 3 to form the composite strip.

Figure 2:
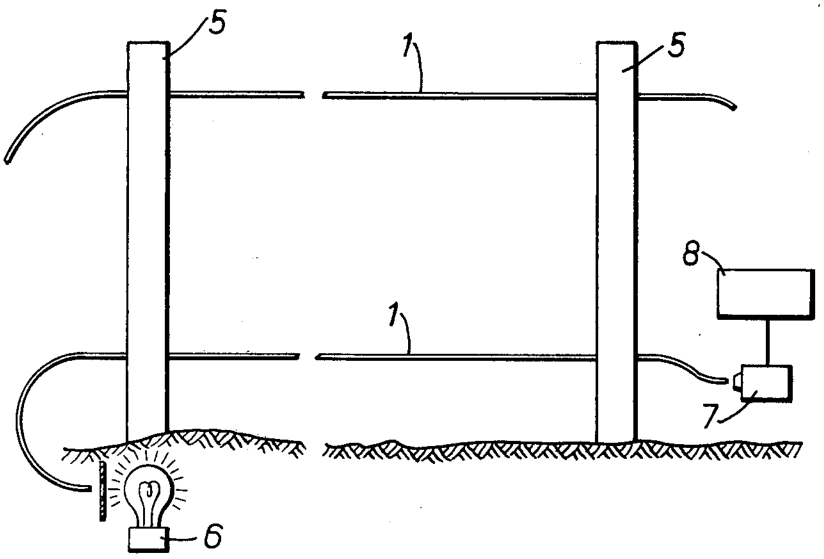
FIG. 2 is a side elevational view showing the two ends of a fence and a security system.

Referring to FIG. 2, two composite strips 1 of the construction just described are disposed to extend along a boundary, of a field for example, the strips being supported by upright posts of a fence, wall or the like at regular intervals, of which the two end posts 5 are shown in FIG. 2. A light source or laser generator 6 is positioned to direct light into one end of the fibre-optic filament at one end of the lower strip 1 and a detector 7 is positioned adjacent the other end of the strip 1 so that its sensitive part receives the light leaving the end of the fibre-optic filament. The detector is connected to a warning device 8 such as an audible or visual alarm. The upper strip 1 is likewise provided with a light source, detector and warning device, although these, for convenience, are not shown in FIG. 2. The following description is confined to the lower strip.

In use, the detector 7 has a first, normal state in which no warning signal is sent to the warning device 8. The detector 7 is so arranged that for negligible disturbances of the strip, such as caused by the effects of wind, the detector remains in this state. However, the detector is set to respond to changes in the intensity of the light leaving the fibre-optic filament which fall outside a predetermined range, so that in the event of a significant disturbance to the strip 1, for example if it is pushed sideways or compressed in any way or cut, the change in the detected light intensity will fall outside the predetermined range and the detector 7 will respond accordingly to operate the warning device 8.

It is to be noted that the fibre-optic filament 3 is preferably of ordinary commercial quality since not only is it considerably cheaper than a high quality filament but also there is inherently a larger variation in transmitted light intensity for any given variation in position of the filament and thus commercial quality filaments are especially suited to the described security system.

Figure 3:
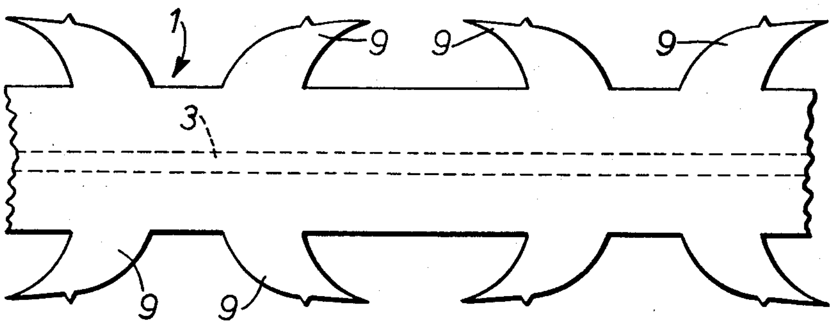
FIG. 3 is a plan view of a composite strip including a single fibre-optic filament and provided on its two sides with barbs, and FIGS. 4A and 4B indicate successive steps in the manufacture of a further modification, shown in cross-section.

Preferably, as shown in FIG. 3, the strip can be formed along its two longitudinal edges with a series of barbs 9 to discourage any animal or human contact with the strip. These barbs can easily be formed by a metal stamping process on the steel carrier strip before the zinc coating process.

It is to be noted that the barbed strip shown in FIG. 3 is advantageous in that, being in strip-form, it can be easily and safely stored wound on a drum while occupying less bulk as compared with a drum on which is wound an identical length of barbed wire.

An an alternative to a zinc coating, the coating may comprise plastics material such as nylon although it should be noted that where the composite strip is provided with barbs, the plastics material coating will reduce the sharpness of the barbs.

Figure 4A:
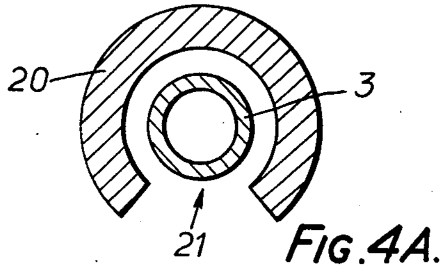
Figure 4B:
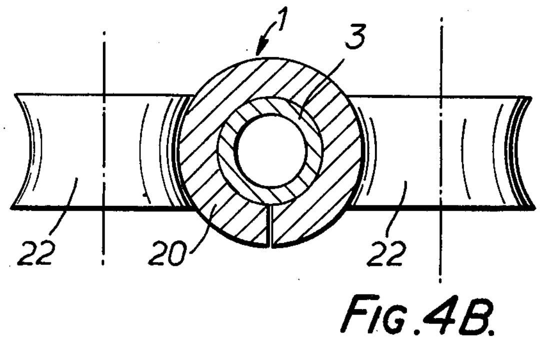

In another construction, a strand 1 is made by introducing the fibre-optic filament 3 through a longitudinal slit 21 in a length of tube 20, made, for example, from rolled-over mild steel strip (FIG. 4A). The slit is then closed by a pressure closing process effected by passing the tube through between a pair of rollers 22 (FIGS. 4B) and may be seam welded. In this construction, the strand would not be provided with barbs or serrations as previously.

In a still further modification the strand 1 comprises a fibre-optic filament, typically having a diameter of approximately 130 microns, coated with plastics material to give the strand high strength, the external diameter of the coating being at least 0.1 inch.

Irrespective of the particular construction of the strand 1, it is possible to direct a pulsed light beam into one end of the fibre-optic filament with a view to enabling larger light intensities to be transmitted for a given transmitting power, thus enabling longer boundaries to be monitored by the optical detector and associated warning device. For greater security, the pulses may be coded and the detector arranged to operate the warning device if the preselected code is not detected.

If the boundary occupies a large distance, for example several miles, it is advantageous if the light source takes the form of a laser generator. Moreover, it is to be noted that instead of a single filament, a plurality of filaments or even a fibre-optic bundle can be used, incorporated in the strip.

A further security measure would be to bury one or more strips, each including a fibre-optic filament, beneath the fence so that any attempt to burrow-in-under the fence would likewise be detected optically in the manner described above.

Fibre-optic filaments used as described with an energy source and detector can be included in a wall structure or mounted in a conduit disposed along the boundary in question. Any attempt to cross the wall by partially dismantling or destroying it, giving rise to any filament being disturbed or broken, or any attempt to cut through the conduit, will enable the attempted instrusion to be detected.

I claim:

1. A security system comprising a fence, wall or the like disposed to extend along a given boundary, at least one strand running along the boundary and carried by the fence, wall or the like, the strand including a fibre-optic waveguide and being formed with barbs or serrations along its edges, an energy source for directing optical radiation along the waveguide from one end thereof, a detector for detecting radiation leaving the waveguide from the other end, and a warning device which is arranged to be actuated by the detector when there is a predetermined change in the light transmitting properties of the waveguide.

2. A security system according to claim 1, wherein the fibre-optic wave guide means is enclosed in sheathing.

3. A security system according to claim 2, wherein the fibre-optic wave guide means comprises a single fibre-optic filament.

4. A security system according to claim 1, wherein a further strand, comprising fibre-optic wave guide means, is buried beneath the fence, wall or the like, there being a further energy source positioned to direct optical radiation along the guide means of said further strand from one end, and a further detector positioned to detect radiation leaving the guide means of said further strand from the other end and arranged to change its state in response to change in detected radiation outside a predetermined range.

5. A security system according to claim 1, wherein the energy source comprises a laser generator.

6. A security system according to claim 5, wherein the generator is set for pulsed operation in accordance with a predetermined code and the associated detector is set to change its state in the absence, in use, of detecting that code.

7. A strip for mounting along a boundary of an area to be protected, said strip comprising an elongate carrier which is integrally formed with barbs or serrations, and fibre-optic wave guide means carried by said carrier.

8. A strip according to claim 7, wherein the elongate carrier is coated with corrosion resistant material which covers the wave guide means.

9. A strip according to claim 7, wherein barbs or serrations are formed at intervals along each longitudinal edge of the strip.

10. A method of making a strip for mounting along a boundary of an area to be protected, said method comprising integrally forming an elongate carrier with barbs or serrations, and arranging that fibre-optic wave guide means are carried by said carrier.

11. A method as claimed in claim 10 in which method the wave guide means is positioned against the elongate carrier, and then the carrier and the wave guide means are coated with protective material.

12. A method according to claim 11, wherein the carrier is formed with longitudinally extending groove means into which the wave guide means is introduced for positioning against the carrier.

13. A method according to claim 10, wherein the barbs or serrations are formed at intervals along longitudinal edges of the strand by a stamping process.

* * * * *